(12) United States Patent
Diab et al.

(10) Patent No.: US 8,537,858 B2
(45) Date of Patent: *Sep. 17, 2013

(54) SYSTEM AND METHOD FOR DYNAMICALLY SWAPPING MASTER AND SLAVE PHYS TO ALLOW ASYMMETRY IN ENERGY EFFICIENT ETHERNET

(75) Inventors: Wael William Diab, San Francisco, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/193,190

(22) Filed: Jul. 28, 2011

(65) Prior Publication Data

US 2011/0280259 A1    Nov. 17, 2011

Related U.S. Application Data

(63) Continuation of application No. 12/396,197, filed on Mar. 2, 2009, now Pat. No. 8,009,695.

(60) Provisional application No. 61/033,613, filed on Mar. 4, 2008, provisional application No. 61/037,152, filed on Mar. 17, 2008.

(51) Int. Cl.
*H04J 3/16* (2006.01)

(52) U.S. Cl.
USPC ............. 370/469; 370/477; 455/574; 455/95; 455/68; 455/255

(58) Field of Classification Search
None
See application file for complete search history.

(56) References Cited

U.S. PATENT DOCUMENTS

| | | |
|---|---|---|
| 5,923,650 A | 7/1999 | Chen et al. |
| 2002/0080825 A1 | 6/2002 | Wolf et al. |
| 2003/0081743 A1 | 5/2003 | Chiang et al. |
| 2003/0220076 A1 | 11/2003 | Katayama et al. |
| 2005/0176377 A1 | 8/2005 | Shoji et al. |

*Primary Examiner* — Dady Chery
(74) *Attorney, Agent, or Firm* — Duane S. Kobayashi

(57) ABSTRACT

A system and method for dynamically swapping master and slave physical layer devices (PHYs) in energy efficient Ethernet (EEE). A physical layer communication mechanism can be used to dynamically reassign the master/slave assignments to facilitate the asymmetric application of EEE to a link.

15 Claims, 4 Drawing Sheets

US 8,537,858 B2

SYSTEM AND METHOD FOR DYNAMICALLY SWAPPING MASTER AND SLAVE PHYS TO ALLOW ASYMMETRY IN ENERGY EFFICIENT ETHERNET

This application is a continuation of non-provisional application Ser. No. 12/396,197, filed Mar. 2, 2009, which claims priority to provisional application No. 61/033,613, filed Mar. 4, 2008, and provisional application No. 61/037,152, filed Mar. 17, 2008. Each above-identified application is incorporated herein by reference in its entirety.

BACKGROUND

1. Field of the Invention

The present invention relates generally to Ethernet systems and, more particularly, to a system and method for dynamically swapping master and slave physical layer devices (PHYs) in energy efficient Ethernet (EEE).

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. In other links, there may be some sustained traffic that is at a fraction of the full rate. Examples of this situation include higher end-offload controllers, audio video bridging (AVB) enabled switches/networks that can carry full uncompressed HD traffic but can transition to streams of compressed traffic, aggregation devices, a link between a phone and a switch with VoIP traffic running, etc. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

One solution to addressing low link utilization is to reduce the high data capacity when it is not needed, thereby saving energy. In other words, a link can use a high data rate when data transmission needs are high, and use a low data rate when data transmission needs are low. In another solution, the link can be designed to enter into a low power idle (LPI) mode where the bulk of the PHY and the energy on the link is turned off (put to sleep) when there is no data transmission. When data is transmitted, it is transmitted at full PHY capacity. While these and other solutions have been proposed, what is needed is a mechanism that enables asymmetry in EEE PHYs reliably without any degradation in bit-error rate (BER), any corruption of packets and/or a restart of the link.

SUMMARY

A system and/or method for dynamically swapping master and slave physical layer devices in energy efficient Ethernet, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
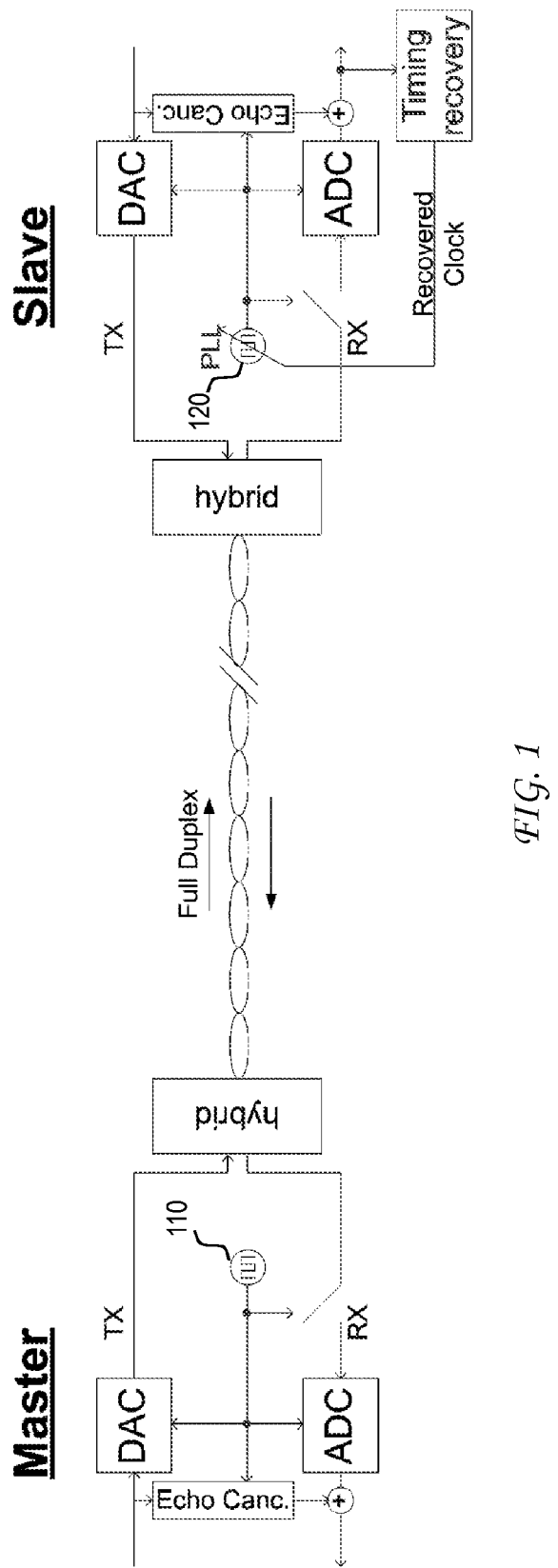
FIG. 1 illustrates an example of loop timing.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts such as twisted pair, backplane, optical, etc. IEEE 802.3az Energy Efficient Ethernet (EEE) continues to evaluate various methods for reducing energy used by reducing link rates during periods of low link utilization. In this process, a protocol would be defined that would facilitate transition to and from lower power consumption modes in response to changes in network demand.

In general, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wakeup from the sleep mode. In one embodiment, a sync signal can be used on the interfaces (i.e., medium dependent interface (MDI) and PHY/medium access control (MAC) interface) to allow for a quick wake-up from the sleep mode and maintain frequency lock. For example, on the MDI interface for a 10 GBASE-T signal, a simple PAM2 pseudorandom bit sequence could be used on pair A during LPI mode. This would not significantly increase the power that is consumed.

In conventional applications, low link utilization is addressed on the link as a whole. This conventional application would not properly address those network situations that are characterized by asymmetric traffic loads. For example, in those networks that include a video server (or switch connected to a video server) there may be a desire to reduce the link capacity in only one direction. This asymmetric link capacity reduction would still serve to reduce the amount of power being consumed.

A full duplex channel carries point-to-point signaling in both directions simultaneously. Echo cancellation is used to separate a remote transmitter's signal from the local transmitter's signal. In multi-pair operation, crosstalk cancellation is used to remove other local transmitter's signals from the remote transmitter's signal. Most forms of echo and crosstalk cancellation require the local transmitter and local receiver be driven from the same clock source to derive their sampling.

A conventional mechanism of achieving the proper clocking in a point-to-point link is by employing loop timing. Loop timing ensures that both ends of a point-to-point link are in exact frequency lock. An example of loop timing is illustrated in FIG. 1, where one side of the link derives its timing from free running local oscillator 110. This side of the link is commonly called the master.

The other side of the link, which is commonly referred to as the slave, derives its timing from a recovered clock. The slave's clock is recovered from the master's transmitted signaling using phase locked loop (PLL) 120 causing the slave to be frequency locked to the master. Loop timing is used in various Ethernet standards (e.g., IEEE 802.3 1000BASE-T and 10 GBASE-T) for symmetrical data transport between two PHYs in a point-to-point configuration.

In an Ethernet link, a PHY can be configured to transmit full rate idle symbols during periods where there is no data to transmit. There is little or no difference in the physical signaling on the line resulting from idle symbols and data symbols. PHY power dissipation while transmitting and receiving idle symbols is typically similar (or equal to) PHY power dissipation while transmitting and receiving data symbols.

As noted, some point-to-point applications include asymmetric traffic loads where data traffic in one direction is significantly higher than data traffic in the other direction. In such a case, one direction will contain mostly data while the other direction will contain mostly idle symbols. Idle symbols are used to maintain loop timing and adaptive DSP elements. However, since no information is transmitted with idle symbols, the power required to keep the lightly utilized direction active with idle symbols is effectively wasted. Rather than transmitting long periods of idle symbols, it would be advantageous to turn off the transmitter on the end of the link, which would otherwise be wasting power transmitting idle symbols.

It would also be advantageous to turn off the receiver on the end of the link, which would otherwise be wasting power receiving idle symbols.

In a link where one direction has been powered down or otherwise reduced while the other direction continues to carry traffic (referred to as an "outage interval"), a mechanism is needed to power up the unused direction when data transmission (or refresh intervals) resumes. Ideally, this process would not disrupt the ongoing data communication in the direction that was not powered down or otherwise reduced.

One of the important functions to be restored to permit powering up the full duplex link is loop timing so that echo and crosstalk cancellation can resume. To avoid disrupting ongoing data communication, the loop timing is established immediately, without the need for re-acquisition, or is maintained during the outage interval.

If data communication is powered down in the direction going from slave to master, the slave transmitter and master receiver are powered down during the outage interval. In this case, the master transmitter and slave receiver remain powered-up communicating at the full rate. As illustrated in FIG. 1, loop timing is maintained in this case. Data transmission from the slave to the master can be powered off without disrupting loop timing. If data communication is powered down in the direction going from the master to the slave, then the master transmitter and slave receiver are powered down during the outage interval. As illustrated, loop timing is lost during the outage interval in this case. Data transmission from the master to the slave cannot be powered off without risk of losing the ability to instantaneously establish loop timing upon resumption of data communication.

Figure 2:
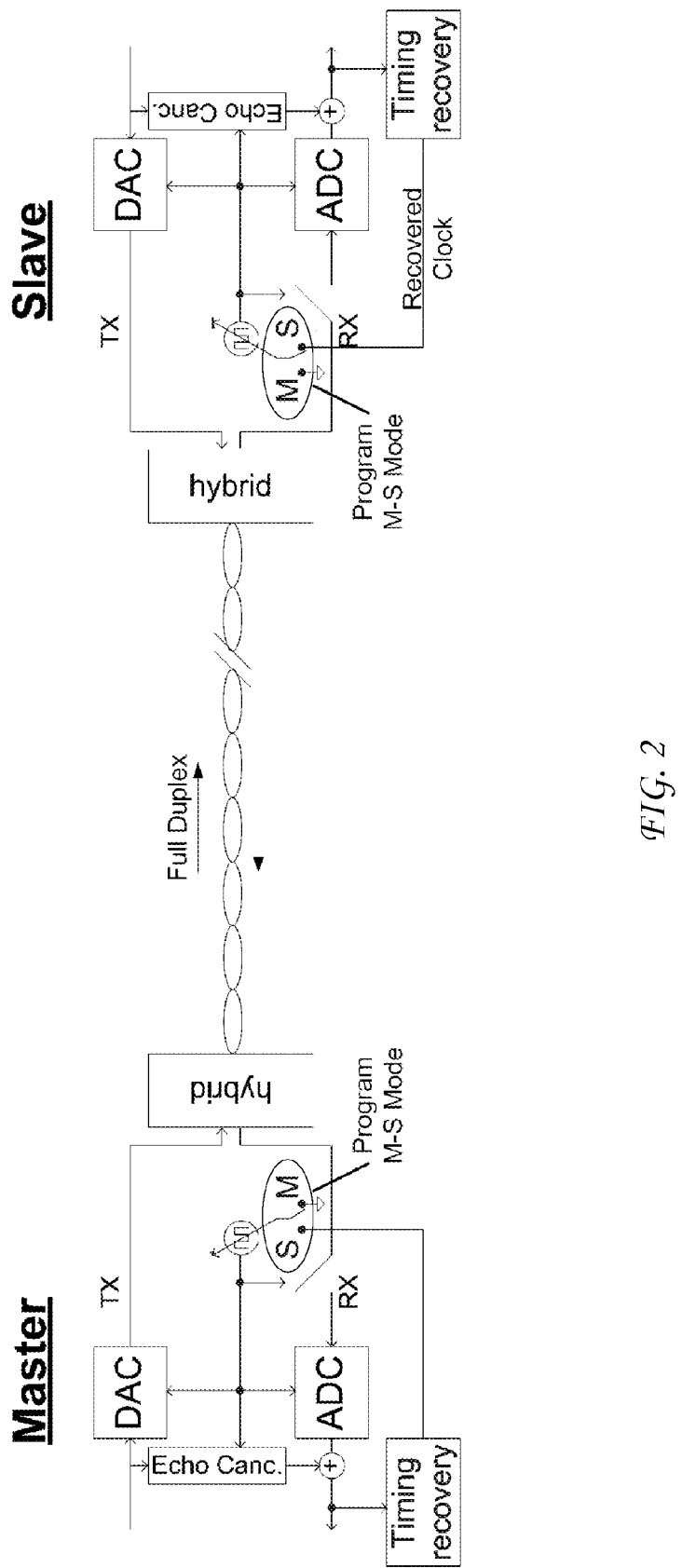
FIG. 2 illustrates an example of master/slave physical layer devices.

It is generally not known a priori which direction in a full duplex link may have long intervals of idle transmission. A mechanism that permits establishment or maintenance of loop timing with an outage interval in either direction is therefore needed. Conventionally, PHYs can have the capability of implementing either the master side or the slave side of a point-to-point full duplex link. As illustrated in FIG. 2, PHYs have the ability to switch roles as the master or the slave. The assignment of master or slave is generally decided randomly during autonegotiation. When the assignment is random, either side can arbitrarily become master or slave.

At any given instant in a master-slave loop timed link, the frequency of the two PHYs are precisely equal to each other. Thus, the assignment of master or slave can be reversed at any given instant in time without disrupting the loop timing operation. The slave side can become the master by switching to a free running oscillator using the given instantaneous frequency offset. The current instantaneous frequency offset is available while a PHY is in slave mode. At the same instant, the master side can become the slave by switching to a PLL that tracks the frequency of the received signal.

When it is desired to power down data communication in the direction where the master transmitter is required to power down, the link can first swap the definition of master-slave assignment. The newly defined slave transmitter is then powered down and the newly defined master receiver is powered down. The newly defined master transmitter and newly defined slave receiver then maintain data transmission and also maintain loop timing through the outage interval.

Figure 3:
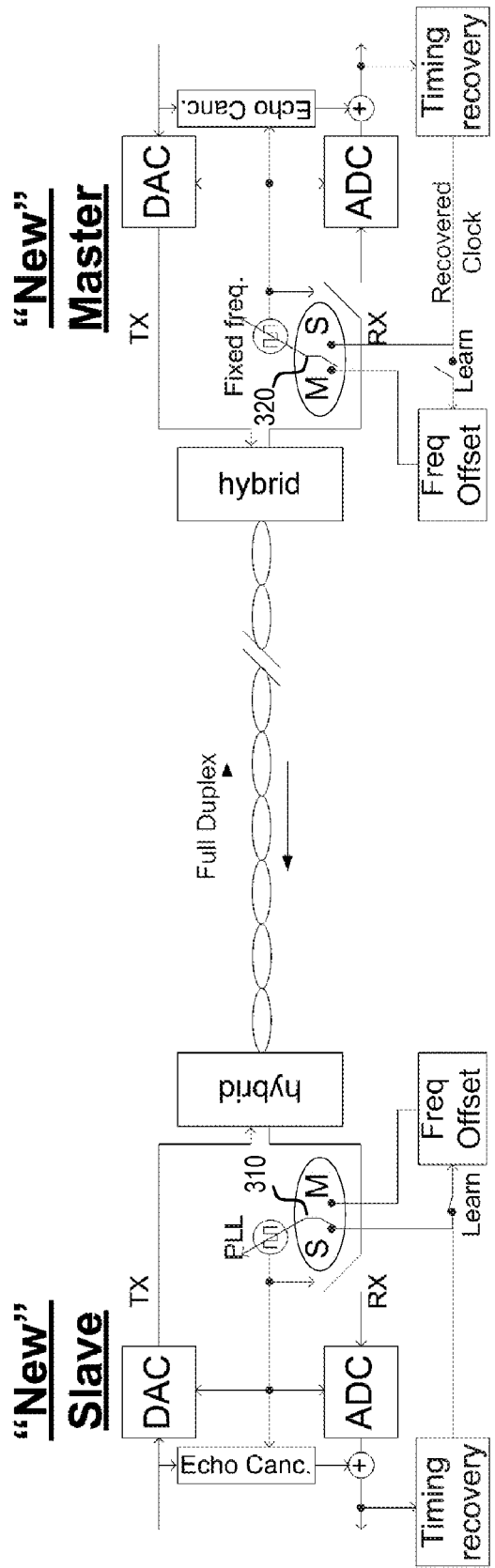
FIG. 3 illustrates an example of master/slave switching.
Figure 4:
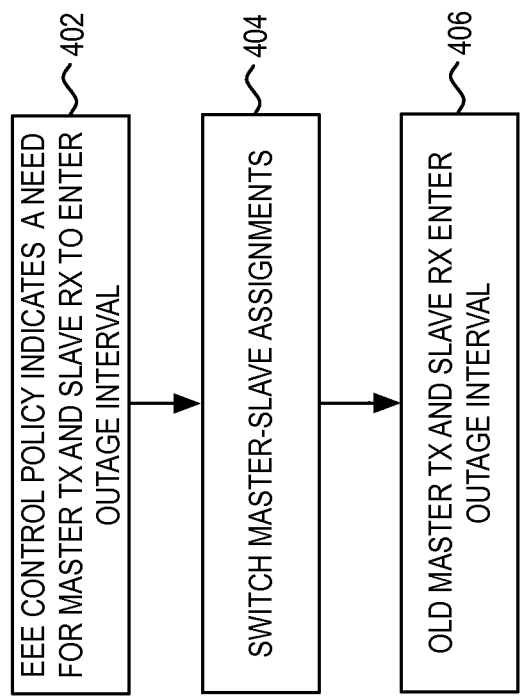
FIG. 4 illustrates a flowchart of a process of the present invention.

To further illustrate this feature of the present invention, reference is now made to the switching illustration of FIG. 3 and the flowchart of FIG. 4. As illustrated in FIG. 4, the process begins where an EEE control policy indicates a need for an active master transmitter and slave receiver on a link to enter an outage interval. This scenario of an active master transmitter and slave receiver is represented by the illustration of FIG. 2.

To facilitate such an indicating need, the process then continues to step 404 where the master-slave assignments are switched between the two ends of the link. As FIG. 3 illustrates, switching the master-slave relationship can be facilitated by properly controlling switches 310, 320 in the PHYs shown in FIG. 2. More specifically, switch 310 is switched from a master (M) position to a slave (S) position, thereby transitioning the PHY from an "old master" to a "new slave." Similarly, switch 320 is switched from a slave (S) position to a master (M) position, thereby transitioning the PHY from an "old slave" to a "new master." In this switching process, the newly defined master can use the frequency offset available at the instant it switches from slave to master, while the newly defined slave can be configured to acquire the frequency offset. Finally, at step 406, the "old" master transmitter and slave receiver can enter an outage interval, thereby conserving power. As has been described, dynamically swapping master-slave definitions permits asymmetric outage intervals to be defined in either direction.

In one embodiment, the dynamic reassignment of the master/slave relationship can be facilitated through a control communication mechanism that is implemented in the physical layer. For example, sequence or ||Q|| ordered sets can be used to communicate control information in switching the master/slave assignments. In general, sequence or ||Q|| ordered sets can be used to signal that a reassignment of the master/slave relationship is needed. In various embodiments, this signaling can occur prior to otherwise contemporaneous with the asymmetric application of EEE to the link. As would be appreciated, the specific form of signaling (e.g., in-band, out-of-band, etc.) would be implementation dependent. For example, 10G applications can use an out-of-band channel. In another example, a packet-based protocol can be defined that would enable the periodic exchange of offset information.

As has been described, the swapping of master and slave PHYs enable asymmetry in EEE. In the situation where both sides enter into an outage interval, the side that comes out of the outage interval first can assume the master role. This can be true whether or not that side was held the master role regardless master when it entered the outage interval. In general, it should be noted that while the swapping of master/slave was shown in the context of loop timing, the principles of the present invention can be applied to the swapping of master/slave for any function that is shared across the link.

It should also be noted that the principles of the present invention can be broadly applied to various contexts, such as in all PHYs that implement EEE (e.g., backplane, twisted pair, optical, etc.). Moreover, the principles of the present invention can be applied to standard or non-standard (e.g., 2.5G, 5G, etc.) link rates, as well as future link rates (e.g., 40G, 100G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   transmitting a control message from a first physical layer device operating in a master mode to a second physical layer device operating in a slave mode, said transmission being in response to a determination of a change in operating state of a first direction of transmission from said first physical layer device to said second physical layer device, wherein said change in operating state impacts an ability of said second physical layer device to recover a clock from a signal received from said first physical layer device;
   switching said first physical layer device from said master mode to said slave mode, wherein said slave mode is responsive to said second physical layer device that has switched from said slave mode to said master mode in response to said transmitted control message; and
   changing an operating state of said first direction of transmission, said change in operating state causing at least part of said first physical layer device to transition to a low power state.

2. The method of claim 1, wherein said transmitting comprises transmitting an in-band control message.

3. The method of claim 1, wherein said transmitting comprises transmitting an out-of-band control message.

4. The method of claim 1, wherein said switching comprises activating a phase locked loop for use by said first physical layer device.

5. The method of claim 1, wherein said changing comprises transitioning said first physical layer device into a subset physical layer device mode.

6. The method of claim 1, wherein said changing comprises transitioning said first physical layer device into a low power idle mode.

7. A method, comprising:
   receiving a control message by said first physical layer device from said second physical layer device, said first physical layer device communicating with said second physical layer device while said first physical layer device is in a slave mode and said second physical layer device is in a master mode, said control message being generated in response to a determination of a change in operating state of a first direction of transmission from said second physical layer device to said first physical layer device relative to a change in operating state of a second direction of transmission from said first physical layer device to said second physical layer device, wherein said change in operating state impacts an ability of said first physical layer device to recover a clock from a signal received from said second physical layer device;
   switching, in response to said received control message, said first physical layer device from a slave mode to a master mode; and
   changing an operating state of said first direction of transmission, said change in operating state causing at least part of said first physical layer device to transition to a low power state.

8. The method of claim 7, wherein said receiving comprises receiving an in-band control message.

9. The method of claim 7, wherein said receiving comprises receiving an out-of-band control message.

10. The method of claim 7, wherein said changing comprises transitioning said first physical layer device into a subset physical layer device mode.

11. The method of claim 7, wherein said changing comprises transitioning said first physical layer device into a low power idle mode.

12. The method of claim 7, wherein said master mode and slave mode is for a loop timing function.

13. A control method, comprising:
- determining whether an operating state of a first transmission direction between a first physical layer device and a second physical layer device is to be changed relative to a second direction of transmission opposite said first direction of transmission, wherein said change in operating state causes at least part of said first physical layer device to transition to a low power state, said transition impacting an ability of said second physical layer device to recover a clock from a signal received from said first physical layer device; and
- if it is determined that said operating state of said first direction of transmission is to be changed, then transmitting a control message from said first physical layer device to said second physical layer device, said control message requesting a reassignment of said second physical layer device from a slave physical layer device to a master physical layer device.

14. The method of claim 13, wherein said transmitting comprises transmitting using physical layer communication.

15. The method of claim 13, wherein said transmitting comprises transmitting using sequence ordered sets.

* * * * *